Ross & Holland,
Globe Valve,
N° 21,276.  Patented Aug. 24, 1858.
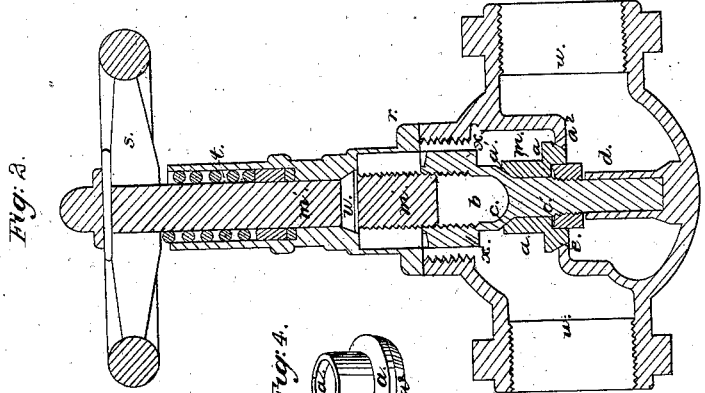
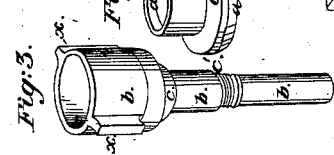
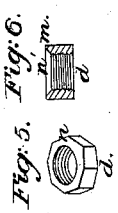
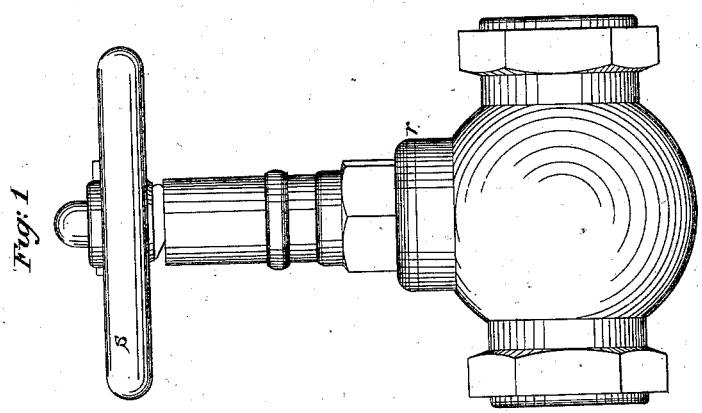

UNITED STATES PATENT OFFICE.

R. ROSS AND W. HOLLAND, OF PHILADELPHIA, PENNSYLVANIA.

STEAM-COCK.

Specification of Letters Patent No. 21,276, dated August 24, 1858.

*To all whom it may concern:*

Be it known that we, ROBERT ROSS and WILLIAM HOLLAND, both of Philadelphia, in the county of Philadelphia and State of Pennsylvania, have invented a Steam-Valve, and that the following is a full, clear, and exact description of the principles or characters which distinguish it from all other things before known and of the usual manner of making, modifying, and using the same, reference being had to the accompanying drawings, of which—

Figure 1 is an exterior view of the valve; Fig. 2, a vertical middle section; Fig. 3, a detached view of the valve stem or guide piece $b$; Fig. 4, a detached view of the valve plug; Figs. 5 and 6, views of the reversible nut $d$.

Our invention consists in certain improvements in steam valves described as follows: The usual way of constructing the valve plug $a$ is to attach it permanently to or make it a part of the stem or guide piece $b$. This is attended with some disadvantages, which we avoid by making the valve plug separate from the stem as follows: The plug $a$, shown by itself in Fig. 4, has two ground faces $a'$, $a^2$ fitted to the seats $c$, $e$. The stem $b$ passes through the plug and has a ground seat $c$ to fit the ground face $a'$. The plug is held in its place by a nut $d$, which screws upon the stem $b$ against the shoulder $c'$. This nut has a plane face $n$ and a concave face $n'$, and is to be used as follows: When the valve is to be held fast, as in case of regrinding or repairing it, the nut $d$ has its concave face upward, as seen in Fig. 2, its raised edge $m$ pressing firmly against the valve plug. When the valve is in use, it is to be left a little loose upon the stem $b$, so as to adapt itself more readily to its seats, the nut $d$, being reversed and a little play left between its plane face $n$ and the valve plug by reason of the shoulder $c'$, so that although the nut is screwed home on the stem, the plug has a slight play. The stem or guide piece $b$ screws upon the valve rod $m'$ and is provided with two wings or guide pieces $x$, $x$, which fit into corresponding recesses in the outer casing or cylinder $r$, so that when the rod $m$ is turned on its axis by the crank or wheel $s$ the guide piece or stem $b$ moves up or down carrying the valve with it. The valve rod $m'$ is provided with a ground valve face $u$ fitted to a seat within the casing $r$, which is an additional security against any escape of steam, this valve being always held to its seat by the action of the helical spring $t$. The passages for the steam $w$, $w$, are as in other valves.

What we claim as our improvements in steam valves, is—

1. The loose valve plug $a$ fitted to the seats $c$ and $e$ above and below as set forth.

2. In combination with the loose valve plug $a$ and the shoulder $c'$ on the stem $b$ we claim the nut $d$ with its plane and concave faces $n$, $n'$ as described.

3. We claim the projecting stem passing through the loose valve plug and fixed fast to the guides $x$ $x$ as set forth.

4. In combination with the valve stem we claim the upper spring valve $u$ as set forth.

ROBERT ROSS.
WILLIAM HOLLAND.

Witnesses:
GEO. MOORE,
WILLIAM TULLE.